United States Patent [19]

Hori et al.

[11] 4,453,997
[45] Jun. 12, 1984

[54] BONDING METHOD

[75] Inventors: Yutaka Hori; Makoto Sunakawa; Michio Satsuma, all of Osaka, Japan

[73] Assignee: Nitto Electric Industrial Co., Ltd., Osaka, Japan

[21] Appl. No.: 468,807

[22] Filed: Feb. 28, 1983

Related U.S. Application Data

[63] Continuation of Ser. No. 198,995, Oct. 20, 1980, abandoned, which is a continuation of Ser. No. 25,622, Mar. 30, 1979, abandoned.

[30] Foreign Application Priority Data

Jan. 31, 1979 [JP] Japan .................................. 54-10796

[51] Int. Cl.$^3$ ........................... C09J 5/00; C09J 7/00; B05D 5/10; B65C 9/25
[52] U.S. Cl. .................................. 156/305; 156/306.9; 156/324.4; 156/332; 427/208.2
[58] Field of Search ................ 156/305, 324, 324.4, 156/307.7, 306.9, 308.8, 323, 327, 332, 275.5, 87, 285, 304.6, 321, 310; 428/349; 427/208.2, 399

[56] References Cited

U.S. PATENT DOCUMENTS

| | | | |
|---|---|---|---|
| 3,725,115 | 4/1973 | Christenson et al. | 156/327 |
| 3,960,638 | 6/1976 | Ogata et al. | 156/305 |
| 4,092,202 | 5/1978 | Bergk et al. | 156/324 |
| 4,218,280 | 8/1980 | Philipp et al. | 150/275.5 |
| 4,243,462 | 1/1981 | Hori et al. | 156/332 |

FOREIGN PATENT DOCUMENTS 47-38532 9/1972 Japan .

Primary Examiner—Edward C. Kimlin
Assistant Examiner—L. Falasco
Attorney, Agent, or Firm—Sughrue, Mion, Zinn, Macpeak & Seas

[57] ABSTRACT

A method for bonding which comprises: interposing between the articles to be bonded at least one of which has an aqueous moisture content in a normal condition of at least about 1% by weight based on the weight of the article, a moisture curable adhesive material and then heating the assembly under pressure to supply water vapor from the moisture-containing article to cure the adhesive material, wherein said adhesive material comprises a sheet, film or tape of a thermofusible adhesive resin and/or rubber containing about 0.1 to 20% by weight based on the weight of the resin and/or rubber of a carboxyl group and not more than about 0.5% by weight free water and uniformly dispersed therein, a powder of an oxide of a metal of Group IIa of Mendeleev's Periodic Table having an average particle diameter of about 0.1 to 1,000μ.

18 Claims, No Drawings

BONDING METHOD

BACKGROUND OF THE INVENTION

This application is a continuation of application Ser. No. 198,995 filed Oct. 20, 1980, now abandoned which is a continuation of application Ser. No. 25,622 filed Mar. 30, 1979 now abandoned.

FIELD OF THE INVENTION

This invention relates to a novel method for bonding. More specifically, it relates to a method for bonding an article containing substantially no moisture in a normal condition to an article containing moisture in a normal condition, or articles having moisture in a normal condition to each other, using an adhesive material which comprises an adhesive resin and/or a rubber which is (are) capable of melt-flowing upon heating, has good wettability with the surface of the articles, and can cure within a short period of time in the presence of water vapor supplied from the moisture-containing article upon heating.

DESCRIPTION OF THE PRIOR ART

Throughout this specification, the term "normal condition" means, for example, 25° C., 65% relative humidity (hereinafter referred to as "R.H.") and atmospheric pressure.

Various adhesive materials have been developed to bond two articles to each other, but none of them is entirely satisfactory with regard to the bonding operation and its bonding characteristics. For example, when two articles are bonded using a solvent-based adhesive as disclosed in, for example, U.S. Pat. No. 3,894,975, the initial adhesion strength of the adhesive is insufficient and, therefore, it is necessary to maintain the bonded articles in a stationary condition under pressure until the adhesive solidifies completely. Furthermore, the great quantity of solvent contained in the adhesive poses a problem of safety and sanitation. Heat-curable adhesives as disclosed in, for example, U.S. Pat. No. 3,896,081, on the other hand, require a large amount of heat until they react and cure, and the heating of the bonded articles for a long period of time may result in heat deterioration of the adherends.

Furthermore, when a so-called hot-melt adhesive as disclosed in, for example, U.S. Pat. No. 3,448,178, comprising an ethylene/vinyl acetate copolymer, an ionomer resin, etc., is used to bond two articles, the adhesion strength of the bonded structure is markedly reduced under heating conditions because this type of adhesive is melted again under heat. For example, even a hot melt adhesive comprising as a main ingredient an ionomer resin which is an ionic copolymer of an α-olefin and an unsaturated organic acid containing at least one kind of cross-linked metal ion dispersed therein decreases in adhesion strength at about 80° C. after solidification. With the hot melt adhesive comprising an ethylene/vinyl acetate copolymer, the adhesion strength decreases at about 60° C. after solidification and in an extreme case, delamination occurs, in spite of the fact that the heating temperature during bonding is as high as at least about 150° C.

As an adhesive material different from these prior adhesives, there is known a spontaneously curable tackifying agent obtained by adding a divalent metal oxide to a pressure-sensitive adhesive high molecular weight polymer having a carboxyl group as disclosed in, for example, Japanese Patent Publication No. 38532/1972. However, curing of this tackifying agent is affected by the environmental condition, and when the ambient atmosphere is dry, a long period of time is required until sufficient adhesion strength is obtained.

SUMMARY OF THE INVENTION

Accordingly, one object of this invention is to provide a method for bonding articles to provide a bonded structure having superior adhesion strength even at high temperatures, which comprises interposing an adhesive material between two articles at least one of which has an aqueous moisture content in a normal condition of at least about 1% by weight, preferably about 2 to 10% by weight, based on the weight of the article, the adhesive material being curable within a short period of time in the presence of water vapor supplied from the articles upon heating under pressure, and allowing the adhesive material to cure upon absorption of aqueous moisture; which bonding method is essentially different from those bonding methods which use solvent-based adhesives requiring a stationary condition under pressure after superimposing two articles, heat-curable adhesives requiring large quantities of heat, hot-melt type adhesives that remelt upon heating after solidification to cause a reduction in adhesion strength, or spontaneously curable tackifying agents requiring a long period of time to effect curing.

Another object of this invention is to provide a method for bonding two articles having different coefficients of thermal expansion or different coefficients of thermal shrinkage without causing heat deterioration or heat deformation of the articles.

Still another object of this invention is to produce laminate building materials for buildings and other structures, laminate surface materials for electrical machinery, and laminate decorative surface materials or sheet-like or plate-like laminates for housing appliances and electrical machinery using the bonding method of this invention.

DETAILED DESCRIPTION OF THE INVENTION

If at least one of two articles to be bonded by the method of the invention has an aqueous moisture content in a normal condition of at least about 1% by weight based on the weight of the article and preferably about 2% to 10% by weight, the moisture can be supplied to the adhesive material by heating to cure the material, and a superior adhesion strength is obtained. Even when one of the two articles contains substantially no moisture in a normal condition but the other article has a moisture content of at least about 1% by weight based on the weight of the article, the moisture can be supplied to the adhesive material upon heating to cure the material, and a high adhesion strength can be obtained.

In the present invention, an article which does not substantially contain aqueous moisture in a normal condition denotes those articles which cannot supply enough water vapor to cure the moisture-curable adhesive material when two such articles are superimposed with the adhesive material interposed therebetween and pressed under heat at about 80° C. or more for about 4 seconds to about 3 minutes. These articles generally have an aqueous moisture content, measured by the method of measuring water absorption of plastics set forth in JIS K7209, of about 0 to less than 1% by weight.

Examples of such non-moisture containing articles include various shaped articles prepared from such synthetic resins as polyvinyl chloride, polyesters, urea resins, melamine resins and acrylic resins, so-called fiber-reinforced plastics obtained by consolidating the aforesaid resins and organic or inorganic fiber yarns or cloths, and sheets or foils of various metals, e.g., Al, Fe, Cu, stainless steel, etc.

Articles having an aqueous moisture content in a normal condition of at least about 1% by weight based on the weight of the article denote those articles which can supply enough water vapor sufficient for curing the adhesive material by heating under pressure at at least about 80° C. for about 4 seconds to about 3 minutes. These articles include, for example, wooden plates (including plywoods), papers, cloths, concrete plates, and slate boards, which have at least about 1% by weight aqueous moisture content at an ordinary temperature and humidity (20° C. and 65% R.H.). Generally, these articles are preferably used in a thickness ranging from about 0.1 to 15 mm although this varies depending upon their moisture content per unit volume.

The articles containing or not containing moisture are used in the form of films, sheets, tapes or plates, or in the state incorporated into structures or units such as buildings, electrical machinery and housing appliances and machinery.

One characteristic feature of this invention is that in bonding two articles, at least one article has an aqueous moisture content in a normal condition of at least about 1% by weight based on the weight of the article, and when the moisture-curable adhesive material is interposed between the two articles and the assembly is pressed under heat, water vapor from the moisture-containing article is supplied to the adhesive material so that the adhesive material cures within a short period of time, and after curing, the adhesive material does not melt again even when heated. For example, when a metal plate containing no moisture is bonded to a wooden plate containing moisture to form a laminate, no heat deterioration or heat deformation is caused to the articles. Thus, the resulting laminate does not warp or distort due to volume expansion or shrinkage caused with time or by environmental conditions.

According to this invention, the moisture-curable adhesive material has a total free water content of not more than about 0.5% by weight and comprises a sheet, film or tape of a thermofusible adhesive resin and/or rubber containing about 0.1 to 20% by weight, preferably about 0.5 to 10% by weight, based on the weight of the resin and/or rubber of a carboxyl group and, uniformly dispersed therein, a powder having an average particle diameter of about 0.1 to 1,000μ composed of an oxide of a Group IIa metal in Mendeleev's Periodic Table or a mixture of such oxides with each other or in admixture with another material.

The adhesive material melt-flows upon heating, exhibits favorable wettability with the surfaces of the articles, and cures upon the absorption of water supplied in the gaseous state from the moisture-containing article, thus maintaining a high adhesion strength especially at high temperatures.

The thermofusible resin and/or rubber containing a carboxyl group which is used in this invention denotes a polymer which contains a polymerizable monomer containing a carboxyl group copolymerized, grafted, or simply added to the resin or rubber, having a viscosity of not more than about $10^9$ poises at 100° C., preferably about $10^4$ to $10^7$ poises, and a weight average molecular weight of about 10,000 to 500,000. When the carboxyl group content is less than about 0.1% by weight, the adhesive material cures only partly even if two articles having the adhesive material interposed therebetween are heated under pressure to supply water vapor from the moisture-containing article. When such a bonded structure is heated after the curing of the adhesive, the adhesive may be melted again to cause a decrease in adhesion strength. If the carboxyl group content is more than about 20% by weight, the flowability of the adhesive material at the time of heat melting is inferior due to hydrogen bonding of the carboxyl group, and a sufficient adhesion strength cannot be obtained. Furthermore, the durability of the bonded structure is poor.

Specific examples of the carboxyl group-containing thermofusible adhesive resin and/or rubber include copolymers obtained by copolymerizing unsaturated carboxylic acids such as acrylic acid, methacrylic acid, itaconic acid, crotonic acid, maleic anhydride, maleic acid and 3-butene-1,2,3-tricarboxylic acid or monoesters (containing 1 to 12 carbon atoms in the ester moiety) of the unsaturated dicarboxylic acids with an ethylenically unsaturated comonomer such as methyl acrylate, methyl methacrylate, ethyl acrylate, ethyl methacrylate, vinyl acetate, octyl acrylate, butyl acrylate, butyl methacrylate, 2-ethylhexyl acrylate, isoprene, styrene, butadiene, acrylonitrile, ethylene, propylene, dibutyl maleate or diethyl maleate. The unsaturated carboxylic acid monomers may be monomers of unsaturated mono-, di- or tricarboxylic acids containing 5 to 20 carbon atoms. Preferred examples of the copolymers are an acrylic acid/methyl acrylate copolymer, a methacrylic acid/methyl acrylate copolymer, an acrylic acid/ethyl acrylate copolymer, a methacrylic acid/ethyl acrylate copolymer, a methacrylic acid/vinyl acetate copolymer, a maleic anhydride/styrene/butadiene copolymer, a methacrylic acid/ethylene/vinyl acetate copolymer, an acrylic acid/methyl methacrylate copolymer, acrylic acid/ethyl methacrylate copolymer, an acrylic acid/methyl methacrylate/butyl acrylate copolymer and a methacrylic acid/ethyl acrylate/octyl acrylate copolymer. Their copolymerization is conducted in the conventional manner as disclosed in, for example, U.S. Pat. No. 3,900,676.

There can also be used products obtained by grafting or adding the aforesaid unsaturated carboxylic acids to thermofusible adhesive resins such as polyethylene, polypropylene or an ethylene/vinyl acetate copolymer, or to thermofusible adhesive rubbers such as a styrene/butadiene block copolymer or trans-type natural rubber. The grafting is conducted in the conventional manner as disclosed in, for example, U.S. Pat. Nos. 2,841,569 and 2,891,018, and the addition reaction is also conducted in the conventional manner as disclosed in, for example, *Rubber Chem. Tech.*, 31, p. 664 (1958).

The Group IIa metal oxide of Mendeleev's Periodic Table or the mixture of such oxides does not perform a curing reaction with the carboxyl-containing thermofusible resin and/or rubber in a dry condition (e.g., about 15% R.H. or less), but functions as a cross-linking agent upon the absorption of water vapor released from a moisture-containing article upon heating. Examples are calcium, strontium and barium oxides. They are used either singly or as a mixture thereof or in admixture with other materials, for example, the mixture may be alumina cement or Portland cement which contains calcium oxide.

The oxide or the mixture thereof is added in an amount of about 1 to 200 parts by weight, preferably about 5 to 100 parts by weight, per 100 parts by weight of the resin and/or rubber in the sheet, film or tape of the aforesaid resin and/or rubber. Since the oxide or the mixture thereof in the form of particles is dispersed uniformly in the sheet, film or tape, it is important to use it in a powder form. The suitable average particle diameter of the oxide or the mixture thereof is about 0.1 to 1,000μ, preferably about 1 to 100μ. If the average particle diameter is less than about 0.1μ, curing of the powder with a trace of free water in the adhesive material proceeds. Thus, when heat and pressure are applied, the adhesive material has a high melt viscosity and does not sufficiently wet the surfaces of the adherends. Hence, a high adhesion strength cannot be obtained. If, on the other hand, the average particle diameter of the metal oxide powder is more than about 1,000μ, the rate of curing of the adhesive material under heat and pressure is slow, and sufficient characteristics cannot be obtained unless the thickness of the adhesive material exceeds about 1,000μ. This is uneconomical and unpractical.

The moisture-curable adhesive material used in this invention comprises as essential ingredients the thermofusible resin and/or rubber and the powder of the metal oxide or the mixture thereof. If desired, the material may contain known additives such as partial cross-linking agents stabilizers, softening agents, tackifying resins and fillers. Particularly, addition of a tackifying resin such as rosin, terpene resins, rosin-modified phenolic resins, and petroleum resins which have good compatibility with the aforesaid thermofusible resins and/or rubbers and a softening point of at least about 50° C. produces a marked effect because it will increase the adhesion strength of the adhesive material after it has completely cured. See U.S. Pat. Nos. 3,880,953 and 3,600,347. Such a tackifying resin may be added in an amount of 5 to 200 parts, preferably 10 to 100 parts, per 100 parts by weight of the thermofusible resin and/or rubber.

A partial cross-linking agent such as polyisocyanate, polyamine, polyepoxy or polymethylol compounds may be added in an amount up to about 10 parts by weight per 100 parts by weight of the thermofusible resin and/or rubber. See, for example, U.S. Pat. Nos. 3,532,652 and 3,729,338.

A stabilizer such as phenol-type degradation inhibitors or amine-type degradation inhibitors may be added in an amount up to about 5 parts by weight per 100 parts by weight of the thermofusible resin and/or rubber. See, for instance, Skeist, *Handbook of Adhesives*, p. 452 (1964).

A softening agent such as xylene resins having a melting point of about 10° C. or less, cumarone oils, process oils, dioctylphthalate and dibutylphthalate may be added in an amount up to about 30 parts by weight per 100 parts by weight of the thermofusible resin and/or rubber.

A filler such as powdered silica, calcium carbonate or carbon may be added in an amount up to about 200 parts by weight per 100 parts by weight of the thermofusible resin and/or rubber. See, for example, U.S. Pat. No. 3,600,347.

One preferred method for producing the adhesive material used in this invention comprises freezing and pulverizing the resin and/or rubber to form a powder preferably having an average particle diameter of about 5 to 300μ, dry-blending this powder with a powder of the metal oxide or the mixture thereof at low temperatures (e.g., 0° C. or less) to form a powdery mixture, spraying or coating the mixture on a processed paper subjected to a releasing treatment (silicon coating) (e.g., a processed paper obtained by laminating polyethylene on a kraft paper and then coating with a silicone polymer, or a thin film such as a rayon non-woven cloth, a polyester woven or non-woven cloth, paper (Japanese paper), a foamed film or a plastic film, etc.) in a spraying or coating thickness of about 10 to 500μ, and returning the temperature gradually to room temperature under pressure (e.g., about 0.5 to 1,000 kg/cm$^2$), or pressing the sheet at a controlled temperature (e.g., about 100° C. or less).

Another preferred example of a manufacturing method comprises uniformly mixing the resin and/or rubber with the powder of the metal oxide or the mixture thereof in an organic solvent such as benzene, toluene, hexane, methyl ethyl ketone, ethyl acetate or mixtures thereof, coating the mixture on the aforesaid processed paper, or coating and/or impregnating it on and/or in the aforesaid thin film, and then drying the coated or impregnated mixture. The coating thickness after drying is generally about 10 to 500μ.

Since the moisture-curable adhesive material used in this invention cures upon the absorption of water vapor supplied from an article having an aqueous moisture content of at least about 1% by weight in the bonding process of this invention, it is necessary to dehydrate the aforesaid resin and/or rubber, the metal oxide or its mixture, optional additives, and the thin film prior to use to the greatest extent possible so that these materials do not substantially contain free water. Of course, the operation of producing the adhesive material from the aforesaid materials should be performed in a dry condition such that water is avoided to the greatest extent possible.

Substantial freedom from free water means that the constituent materials of the adhesive material have a free water content of less than about 0.5% by weight and are nearly in an absolutely dry condition. If the water content is over about 0.5% by weight, the adhesive material partially cures during storage. Thus, when such an adhesive material is interposed between two articles and heated under pressure, the cross-linked portion of the adhesive material impedes the melt-flowability of the adhesive material or inhibits the formation of a uniform film from the molten adhesive material, or the wetting of the surfaces of the articles with the adhesive material or its penetrability are hampered. Thus, sufficient adhesion strength cannot be obtained.

The aforesaid dehydration can be effected by generally known heating, pressure reducing, or centrifugal separating methods. The pressure reducing dehydration method is most suitable because it does not degenerate the raw materials. Liquid materials may also be dehydrated by using a desiccant such as calcium chloride or anhydrous silica gel.

The drying conditions employed during the manufacturing process of the adhesive material and the storage conditions for the product after the manufacture are described in detail below. In order to maintain the water content of the adhesive material at not more than about 0.5% by weight just prior to use, the manufacturing process is desirably conducted in a dry condition at about 30% R.H. or below. When the solvent drying temperature is elevated during the manufacture, no adverse effect is exerted on the curing reaction. However, the effect of humidity is great, and when the relative humidity during the manufacturing process is more than about 30%, the adhesive material absorbs moisture during production and sufficient adhesion strength cannot be obtained as described hereinabove. It is desirable for the reasons stated hereinabove that the adhesive material be stored at an R.H. of not more than about 15% by packaging it with a moisture-impermeable material such as a composite sheet of an aluminum foil and a plastic cover.

The moisture-curable adhesive material (in a sheet, film or tape form) used in the bonding method of this invention having the specified composition described hereinabove has unique properties in that (1) no substantial curing reaction proceeds prior to use, (2) upon heating, it flows and melts and gives favorable wetting to the surfaces of the adherends, (3) it cures within a short period of time upon absorption of water vapor supplied from an article containing moisture by heating under pressure, and (4) after curing, it is not melted again even when exposed to temperatures above that used at the time of heat melting.

The heating and pressing conditions at the time of bonding vary according to the thickness of the bonded structure desired, the heat conduction of the articles and the moisture content. Generally, the following conditions are employed.

Heating temperature: about 60° to 200° C., preferably about 100° to 150° C.

Pressure: about 0.1 to 100 kg/cm$^2$, preferably about 1 to 30 kg/cm$^2$

Time for heating under pressure: about 4 seconds to about 3 minutes, preferably about 10 seconds to about 1 minute The method of bonding in accordance with this invention is characterized by the fact that two articles can be bonded by supplying a small amount of heat within a short period of time as described above without causing heat deterioration, heat deformation, warpage or distortion of the articles if at least one of these articles has an aqueous moisture content in a normal condition of at least about 1% by weight. Specific examples of applications of the present invention include the production of laminated articles by bonding a metal coated plate to a wooden plate (including wooden materials such as plywood and particle board), bonding a plastic decorative board to a wooden plate, bonding a plastic sheet or film to a wooden plate or paper, or two sheets, films or plate-like articles to each other; the bonding of interior and exterior trimming or finishing materials such as a ceiling plate, wall plate or floor plate to a substrate material of a support structure; splicing of cotton cloths and paper; and bonding of a honeycomb structural material to a surface material.

The present invention is now explained in greater detail by reference to the following examples. Unless otherwise indicated, all percents, parts, ratios and the like are by weight.

EXAMPLE 1

A three-necked flask was charged with 100 g of methyl methacrylate, 100 g of ethyl acrylate, 5 g of methacrylic acid, and 700 g of ethyl acetate all of which had been dehydrated. They were stirred for 1 hour at 65° C. in an atmosphere of nitrogen. Then, 0.2 g of azobisisobutyronitrile was added, and the mixture was stirred further for 10 minutes. The mixture was further stirred at 70° C. for 5 hours to perform copolymerization. Thus, a thermofusible adhesive copolymer having a weight average molecular weight of about 200,000 was obtained.

50 parts of a rosin-modified phenol resin and 50 parts of calcium oxide having an average particle diameter of about 5μ, both based on 100 parts of the solids content of the copolymer, were added to the copolymer, and they were uniformly dispersed. The dispersion was flow-cast onto a glass plate (subjected to a release treatment by coating and baking a silicone polymer) so that the thickness of the film after drying would be about 100μ, and dried at 50° C. for 2 minutes to obtain a moisture-curable film-like adhesive material having a water content of 0.08%.

Japan cedar boards having a thickness of 1.5 mm and an aqueous moisture content in a normal condition of 13% were heat-treated to adjust the moisture content as shown in Table 1. The film-like adhesive material was interposed between two cedar boards having the same moisture content, and the assembly was heated at 100° C. for 20 seconds under a pressure of 2 kg/cm$^2$ in a working atmosphere kept at 20° C. and an R.H. of 65% to make a sample bonded structure. The shear adhesion strengths of such samples are shown in Table 1.

TABLE 1

| | Aqueous Moisture Content of the Cedar Boards (%) | | | | |
|---|---|---|---|---|---|
| | 0 | 1 | 5 | 8 | 10 |
| Shear adhesion strength at 70° C. (kg/cm$^2$) | 2 | 18 | 22 | 24 | 25 |

The shear adhesion strength was measured at a pulling speed of 10 mm/min. The measurement was made in an atmosphere kept at 70° C. because if the temperature of the sample is returned to room temperature (about 15° to 25° C.), the adhesion strength inherent to the thermofusible adhesive resin positively affects the result, and the cross-linked state of the adhesive resin by the addition of calcium oxide cannot be exactly measured in terms of adhesion strength.

EXAMPLE 2

A three-necked flask was charged with 100 g of butyl acrylate, 20 g of methyl methacrylate, 15 g of acrylic acid and 400 g of ethyl acetate which had been dehydrated. They were stirred for 1 hour at 65° C. in a stream of nitrogen, and then 0.1 g of azobisisobutyronitrile was added. The mixture was further stirred at 70° C. for 5 hours to perform copolymerization. Thus, a thermofusible adhesive copolymer having a mean molecular weight of about 400,000 was obtained.

To 100 parts, as solids content, of the copolymer were added 50 parts of a phenol-modified resin having a softening point of 135° C., 100 parts by weight of calcium oxide having an average particle diameter of about 200μ and 5 parts by weight of a polyisocyanate compound. They were uniformly dispersed. Subsequently, by operating in the same way as in Example 1, a film-like adhesive material having a water content of 0.05% was obtained.

The resulting film-like adhesive material was interposed between articles (A) and (B) shown in Table 2, and the assembly was heated at 120° C. for 30 seconds under a pressure of 2 kg/cm$^2$ to form a sample bonded structure. The shear adhesion strengths of such samples were measured, and are shown in Table 2.

TABLE 2

| Articles | | | |
|---|---|---|---|
| (A) (water content, wt %) | Slate board (4) | Slate board (0.5) | Concrete plate (6) |
| (B) Moisture-free | Aluminum plate | Aluminum plate | Aluminum plate |
| Shear adhesion strength at 70° C. (kg/cm$^2$) | 24 | 6 | 21 |

It is clearly seen from the foregoing that the bonding method of this invention can give superior adhesion strength even under heating conditions.

EXAMPLE 3

100 g of a dehydrated styrene/butadiene block copolymer (B-S-B type) and 2 g of maleic anhydride were mixed using a mixing roll for 20 minutes. The mixture was treated at a temperature of 110° C. at a reduced pressure of 0.1 mmHg to remove unreacted maleic anhydride thereby obtaining a thermofusible adhesive copolymer (rubber) having a maleic anhydride content of 0.6% and a mean molecular weight of about 150,000.

30 parts of a terpene-modified phenol resin and 50 parts of calcium oxide having an average particle diameter of about 8$\mu$ were dissolved in dehydrated benzene and added to 100 parts of the copolymer, and were uniformly dispersed.

Subsequently, the same technique as employed in Example 1 were followed to obtain a film-like adhesive material having a thickness of 100$\mu$ and a moisture content of 0.07%.

The shear adhesion strength of the adhesive material is shown in Table 3.

EXAMPLE 4

100 g of a dehydrated ethylene/vinyl acetate/acrylic acid copolymer (acrylic acid content 12%, melt index 2) and 100 g of calcium oxide having an average particle diameter of about 10$\mu$ were uniformly mixed and dispersed.

The mixture was press molded to obtain a film-like adhesive material having a thickness of 100$\mu$ and an aqueous moisture content of 0.1%.

The shear adhesion strength of the adhesive material is shown in Table 3.

EXAMPLE 5

To 100 parts, as solids content, of the thermofusible adhesive copolymer obtained in Example 1 were added 20 parts of a rosin-modified phenol resin and Portland cement having an average particle diameter of about 8$\mu$. They were uniformly mixed and dispersed.

Subsequently, the same procedures employed in Example 1 were repeated to obtain a film-like adhesive material having a thickness of 100$\mu$ and an aqueous moisture content of 0.09%.

The shear adhesion strength of the adhesive material is shown in Table 3.

EXAMPLE 6

The same procedures employed in Example 5 were followed except that the average particle diameter of the Portland cement was about 300 to 500$\mu$. A film-like adhesive material having a thickness of 550$\mu$ was obtained.

The shear adhesion strength of the adhesive material is shown in Table 3.

EXAMPLE 7

The same procedures employed in Example 1 were followed except that an alumina cement having an average particle diameter of 8$\mu$ was used instead of calcium oxide to obtain a film-like adhesive material.

The shear adhesion strength of the adhesive material is shown in Table 3.

EXAMPLE 8

The same procedures employed in Example 1 were followed except that strontium oxide having an average particle diameter of about 8$\mu$ was used instead of calcium oxide to obtain a film-like adhesive material.

The shear adhesion strength of the adhesive material is shown in Table 3.

TABLE 3

| | Example No. | | | | | |
|---|---|---|---|---|---|---|
| | 3 | 4 | 5 | 6 | 7 | 8 |
| Shear adhesion strength at 70° C. (kg/cm$^2$)* | 18 | 28 | 24 | 20 | 22 | 21 |

*Measured in the same manner as in Example 1 except that Japan cedar boards having a thickness of 2 mm and an aqueous moisture content of 13% by weight were used.

EXAMPLE 9

100 parts of a butadiene/acrylonitrile copolymer (weight ratio 8:2) which had been dehydrated was dissolved in a mixed solvent of methyl ethyl ketone and xylene (volume ratio 1:1), and 50 parts of a methyl methacrylate/acrylic acid copolymer (weight ratio 8:2) which had been dehydrated and 1 part of cumene hydroperoxide were added thereto. They were stirred for 5 hours at 100° C. in a stream of nitrogen to perform copolymerization. Thus, a thermofusible graft copolymer having a weight average molecular weight of about 150,000 was obtained.

To 100 parts, as solids content, of the copolymer were added 30 parts of a rosin-modified phenol resin, 50 parts of calcium oxide having an average particle diameter of about 10$\mu$, 20 parts of calcium bicarbonate, 20 parts of cumarone oil and 2 parts of a stabilizer. They were uniformly dispersed. Subsequently, by operating in the same way as in Example 1, a film-like adhesive material having a thickness of 100$\mu$ and a water content of 0.05% was obtained.

The resulting film-like adhesive material was interposed between two Japan cedar boards having an aqueous moisture content of 10% and subsequently, the same techniques as employed in Example 1 were followed.

The shear adhesion strength at 70° C. was 22 kg/cm$^2$.

For the sake of comparison, the same procedures as employed above were followed except that calcium oxide was not used.

The shear adhesion strength at 70° C. was 4 kg/cm$^2$.

While the invention has been described in detail and with reference to specific embodiments thereof, it will be apparent to one skilled in the art that various changes and modifications can be made therein without departing from the spirit and scope thereof.

What is claimed is:

1. A method for bonding which comprises: interposing between the articles to be bonded at least one of which has an aqueous moisture content in a normal condition of at least about 1% by weight based on the weight of the article, a moisture curable adhesive material and then heating the assembly under pressure to supply water vapor from said at least about 1% moisture-containing article to cure the adhesive material, wherein said adhesive material comprises a sheet, film or tape of at least one of a thermofusible adhesive resin and rubber containing about 0.1 to 20% by weight based on the weight of the at least one of a resin and rubber of carboxyl groups and not more than about 0.5% by weight free water and uniformly dispersed therein, a powder of an oxide of a metal of Group IIa of Mendeleev's Periodic Table having an average particle diameter of about 0.1 to 1,000μ, said at least one of a thermofusible resin and rubber having a viscosity of not more than $10^9$ poises at 100° C., a weight average molecular weight of about 10,000 to 500,000 and additionally containing a conventional tackifying resin, said moisture curable adhesive material not functioning as a spontaneously curable tackifying agent obtained by adding a divalent metal oxide to a pressure-sensitive adhesive high molecular weight polymer having a carboxyl group.

2. The process of claim 1, wherein said heat treatment is conducted at about 60° to 200° C.

3. The process of claim 2, wherein said pressure is about 0.1 to 100 kg/cm².

4. The process of claim 1, wherein said at least one of a thermofusible resin and rubber has a viscosity of about $10^4$ to $10^7$ poises at 100° C.

5. The process of claim 1, wherein said resin is an addition polymerized copolymer of an unsaturated carboxylic acid and an ethylenically unsaturated monomer other than said unsaturated carboxylic acids.

6. The process of claim 1, wherein said resin is a copolymer of acrylic acid, methacrylic acid, itaconic acid, crotonic acid, maleic anhydride, maleic acid, and 3-butene-1,2,3-tricarboxylic acid; or monoesters of said dicarboxylic acids; and an ethylenically unsaturated comonomer selected from the group consisting of methacrylate, methylmethacrylate, ethylacrylate, ethylmethylacrylate, octylacrylate, butylacrylate, butylmethacrylate, 2-ethyl hexylacrylate, isoprene, vinyl acetate, styrene, butadiene, acrylonitrile, ethylene, propylene, dibutyl maleate and diethyl maleate.

7. The process of claim 1, wherein said resin is a graft copolymer obtained by grafting an unsaturated carboxylic acid to a thermofusible adhesive resin or to a thermofusible adhesive rubber.

8. The process of claim 1, wherein said metal oxide is calcium oxide, strontium oxide, or barium oxide.

9. The process of claim 1, wherein said oxide is present in said at least one of a resin and rubber in an amount of about 1 to 200 parts by weight per 100 parts by weight of said at least one of a resin and rubber.

10. The process of claim 9, wherein said metal oxide has a particle size of about 1 to 100 microns.

11. The process of claim 10, wherein said carboxylic acid content is about 0.5 to 10% by weight based on the weight of said at least one of a resin and rubber.

12. The process of claim 1, wherein said at least one of a thermofusible adhesive resin and rubber additionally contains a conventional cross-linking agent.

13. The process of claim 1, wherein said at least one of a thermofusible adhesive resin and rubber additionally contains a conventional phenol-type or amine-type degradation inhibitor.

14. The process of claim 1, wherein said at least one of a thermofusible adhesive resin and rubber additionally contains a conventional softening agent.

15. The process of claim 1, wherein said at least one of a thermofusible adhesive resin and rubber additionally contains a conventional filler.

16. The process of claim 1, wherein said heat treatment is carried out at about 100° to 150° C.

17. The process of claim 16, wherein said pressure is about 1 to 30 kg/cm².

18. The process of claim 1, wherein at least one of said articles to be bonded is a wooden plate, paper, cloth, a concrete plate or a slate board.

* * * * *